(12) United States Patent
Wang et al.

(10) Patent No.: US 10,917,041 B2
(45) Date of Patent: Feb. 9, 2021

(54) WATERPROOF AND ELECTRICITY-INSULATING SUPPORT STRUCTURE FOR SOLAR PANELS

(71) Applicants: Chen Lu Wang, Douliu (TW); Chao Kai Wang, Douliu (TW)

(72) Inventors: Chen Lu Wang, Douliu (TW); Chao Kai Wang, Douliu (TW)

( * ) Notice: Subject to any disclaimer, the term of this patent is extended or adjusted under 35 U.S.C. 154(b) by 24 days.

(21) Appl. No.: 16/448,525

(22) Filed: Jun. 21, 2019

(65) Prior Publication Data

US 2020/0059195 A1  Feb. 20, 2020

(30) Foreign Application Priority Data

Aug. 20, 2018  (TW) .............................. 107211387 U
Aug. 20, 2018  (TW) .............................. 107211388 U

(51) Int. Cl.
| | |
|---|---|
| *F24S 25/00* | (2018.01) |
| *H02S 30/10* | (2014.01) |
| *F24S 25/70* | (2018.01) |
| *F24S 25/67* | (2018.01) |
| *H02S 20/20* | (2014.01) |
| *F24S 25/63* | (2018.01) |
| *F24S 25/13* | (2018.01) |

(52) U.S. Cl.
CPC .............. *H02S 30/10* (2014.12); *F24S 25/13* (2018.05); *F24S 25/63* (2018.05); *F24S 25/67* (2018.05); *F24S 25/70* (2018.05); *H02S 20/20* (2014.12)

(58) Field of Classification Search
CPC .......... H02S 30/10; H02S 20/20; F24S 25/67; F24S 25/63

USPC .......................................... 52/468, 772, 774
See application file for complete search history.

(56) References Cited

U.S. PATENT DOCUMENTS

| | | | | | |
|---|---|---|---|---|---|
| 4,745,723 | A | * | 5/1988 | Esposito ................... | E04D 3/08 52/461 |
| 6,588,165 | B1 | * | 7/2003 | Wright .................... | E04F 19/06 52/459 |
| 6,662,512 | B2 | * | 12/2003 | Westphal .............. | E06B 1/6007 52/204.1 |
| 6,988,344 | B1 | * | 1/2006 | Krueger ................ | F16B 5/0614 52/464 |
| 7,743,575 | B2 | * | 6/2010 | Ito ........................ | E04F 13/0889 52/582.1 |
| 10,594,250 | B2 | * | 3/2020 | Schuit ..................... | F24S 25/65 |
| 2004/0010998 | A1 | * | 1/2004 | Turco .................. | E04F 13/0889 52/762 |
| 2009/0200443 | A1 | * | 8/2009 | Burtscher ............. | F24S 25/636 248/316.1 |

(Continued)

*Primary Examiner* — Gisele D Ford
(74) *Attorney, Agent, or Firm* — Thomas J. Nikolai; DeWitt LLP

(57) ABSTRACT

A waterproof and electricity-insulating support structure for solar panels includes a base frame having a top portion with two side portions disposed at two sides of the top portion. Each of the side portions connects with a bottom portion to be fixed on a steel frame forming a roof. A fastening member is fixed to the top portion of the base frame to form an assembling space for solar panels therebetween. A plurality of rubber strips for waterproofing and insulating from electricity are disposed between the side portions and the solar panels and between the fastening member and the solar panels.

2 Claims, 3 Drawing Sheets

(56) References Cited

U.S. PATENT DOCUMENTS

| | | | |
|---|---|---|---|
| 2015/0249423 A1* | 9/2015 | Braunstein | F24S 25/636 52/173.3 |
| 2016/0111996 A1* | 4/2016 | Stephan | F16B 5/0028 248/316.6 |
| 2016/0111997 A1* | 4/2016 | Ganshaw | F16M 13/02 248/224.7 |
| 2016/0173024 A1* | 6/2016 | Itou | F24S 25/35 136/251 |
| 2016/0268958 A1* | 9/2016 | Wildes | F24S 25/70 |
| 2017/0284091 A1* | 10/2017 | Loyd | E04B 2/967 |
| 2018/0031278 A1* | 2/2018 | Zabel | H02S 20/23 |
| 2018/0191290 A1* | 7/2018 | Guthrie | H01L 31/048 |
| 2019/0296689 A1* | 9/2019 | Haddock | H02S 30/00 |

\* cited by examiner

WATERPROOF AND ELECTRICITY-INSULATING SUPPORT STRUCTURE FOR SOLAR PANELS

BACKGROUND OF THE INVENTION

Technical Field

The present invention relates to a support frame, and more particularly to a support frame for assembling solar panels.

Description of Related Art

Solar panels generate electricity by absorbing solar energy and therefore are put outdoors. However, it is hard to avoid getting wet in the rain. Solar panels and support frames thereof are made of metals so as to easily get rusted by acid rain where impurities in the air adhere. After the solar panels and the support frames get rusted, rainwater will invade the gaps between the solar panels and the support frames to cause electricity leakage and short circuit, damaging the solar panels.

SUMMARY OF THE INVENTION

The primary objective of the present invention is to use rubber strips to space the frames and the solar panels out, avoiding causing short circuit. Rainwater is also obstructed by the rubber strips to prevent the solar panels from rusting. Hence, the solar panels are protected well and the service life can be elongated.

For achieving the foregoing and other objectives, the present invention provides a waterproof and electricity-insulating support structure for solar panels including a base frame having a top portion with two side portions disposed at two sides of the top portion. Each of the side portions connects with a bottom portion to be fixed on a steel frame forming a roof. A fastening member is fixed to the top portion of the base frame to form an assembling space for solar panels therebetween. A plurality of rubber strips for waterproofing and insulating from electricity are disposed between the side portions and the solar panels and between the fastening member and the solar panels.

In one embodiment, each of the side portions of the base frame comprises a first vertical section and a second vertical section not taller than the first vertical section. A horizontal section connects the first vertical section and the second vertical section. Each of the first vertical section and the horizontal section couples with one said rubber strip.

In one embodiment, a groove for draining and ventilating is disposed at a junction of the horizontal section and the first vertical section.

DETAILED DESCRIPTION OF THE INVENTION

Figure 1:
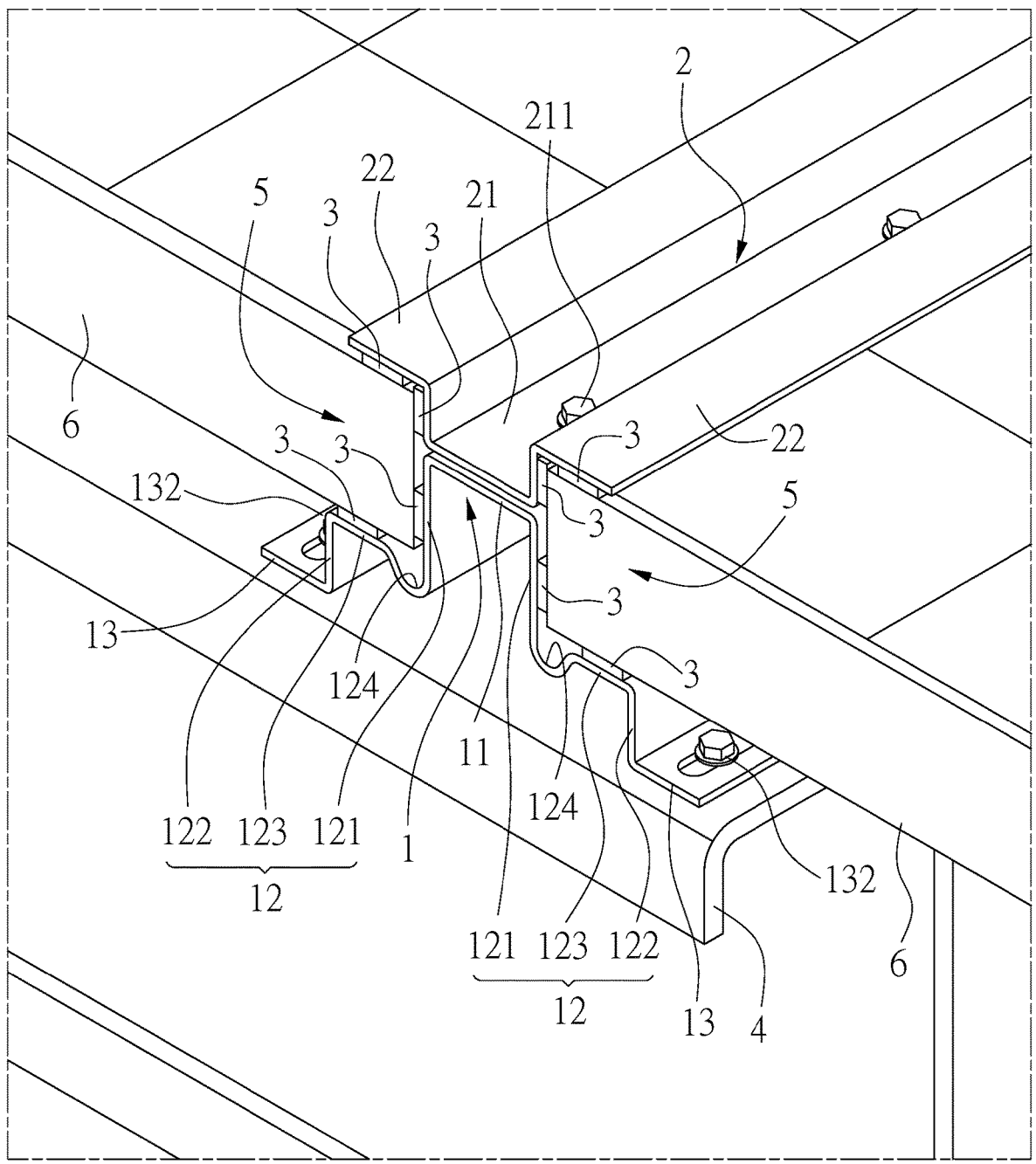
FIG. 1 is a perspective view of a support structure according to the present invention.
Figure 2:
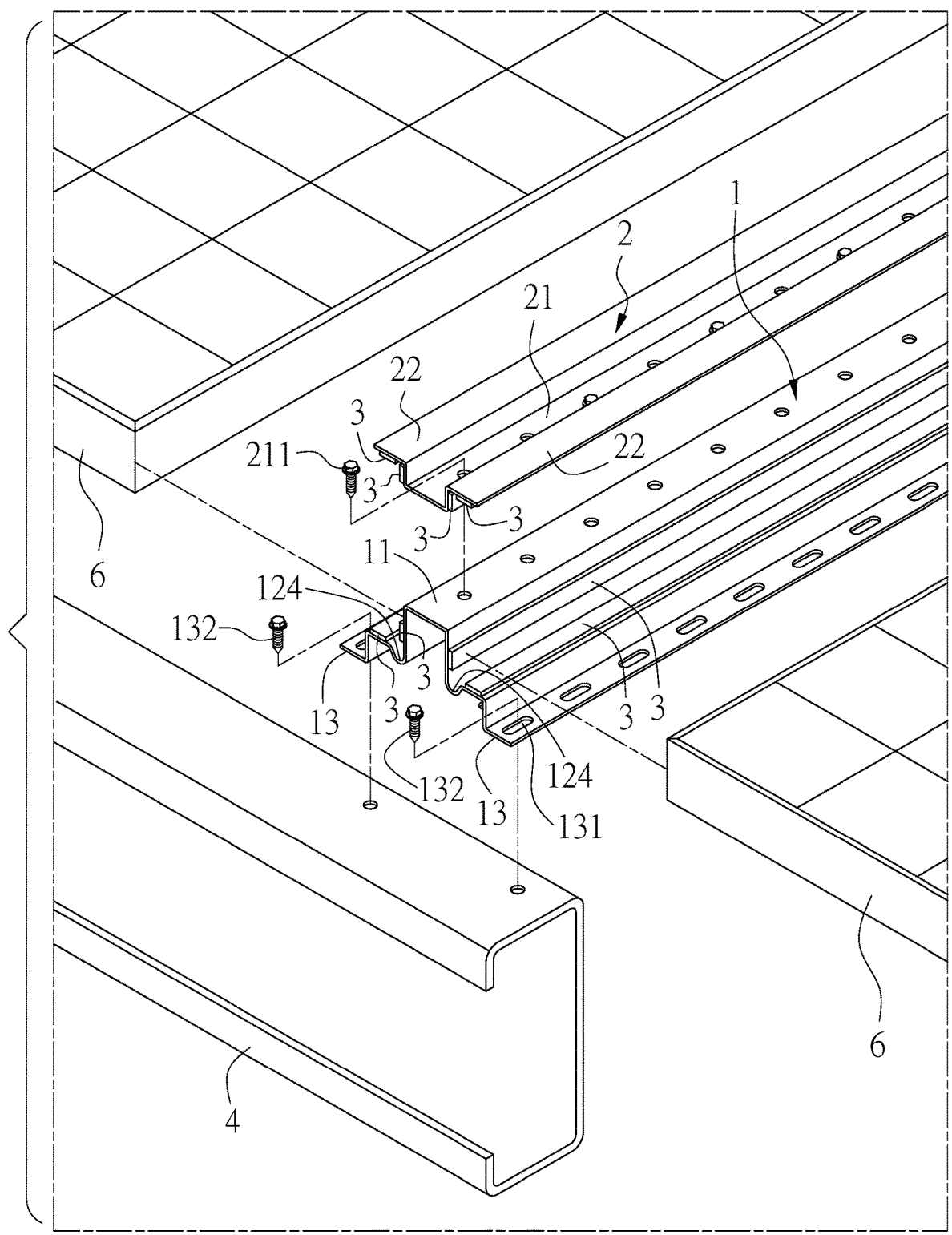
FIG. 2 is an exploded view of the support structure.
Figure 3:
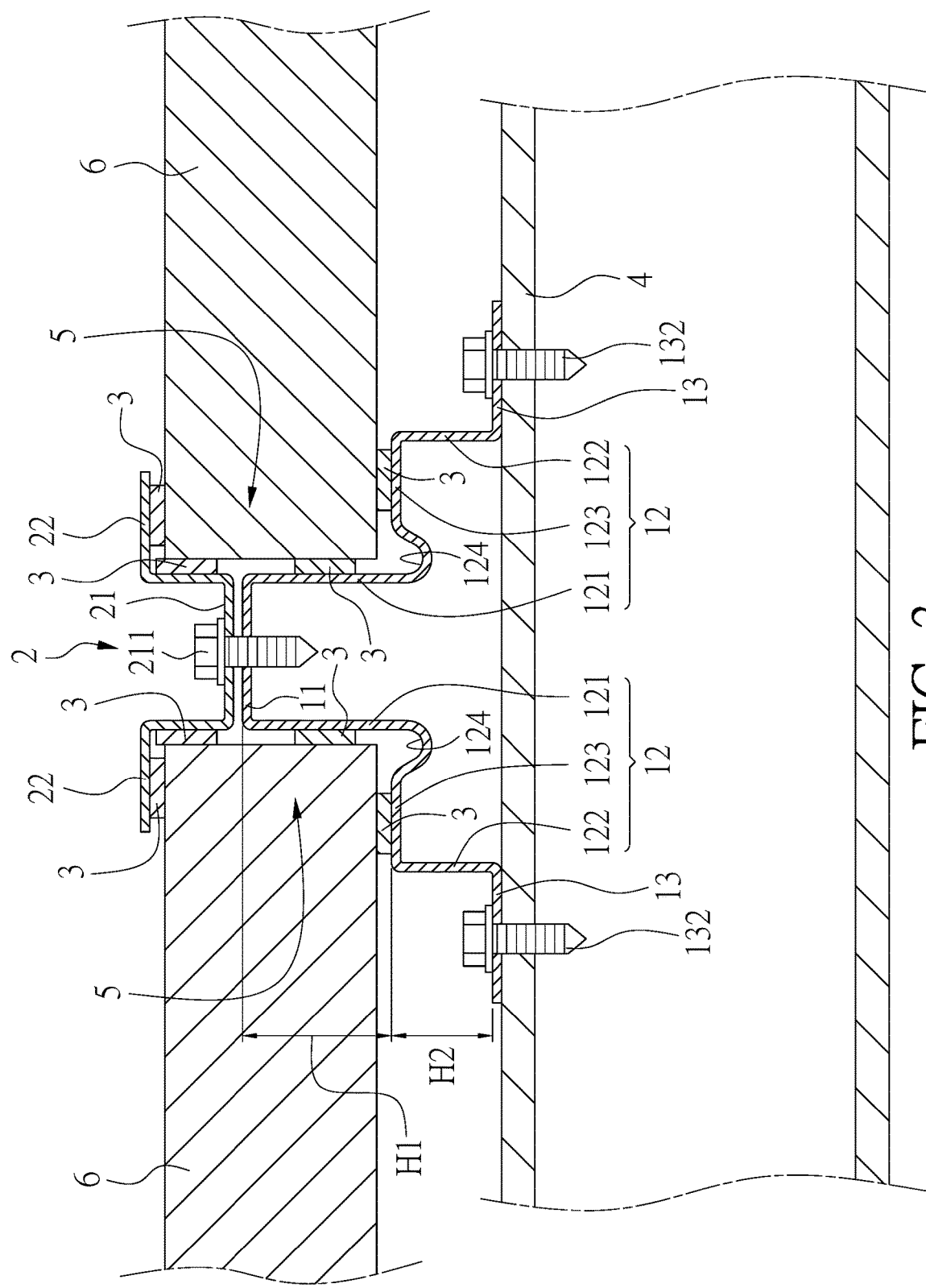
FIG. 3 is a cross sectional view of the support structure.

Referring to FIG. 1 to FIG. 3, the waterproof and electricity-insulating support structure for solar panels in the present invention is a long structure including a base frame 1, a fastening member 2 and a plurality of rubber strips 3 for waterproofing and insulating from electricity. The base frame 1 has a top portion 11 raised by two side portions 12 provided at two sides of the top portion 11 along a longitudinal direction. Each of the side portions 12 connects with a bottom portion 13 extending away from each other. A plurality of holes 131 is provided on the bottom portions 13 for screws 132 passing through and fixing the bottom portions 13 with steel structure 4 forming a roof.

Each of the side portions 12 includes a first vertical section 121 and a second vertical section 122. The first vertical section 121 connects with the top portion 11. The second vertical section 122 connects with the bottom portion 13. A horizontal section 123 connects the first vertical section 121 and the second vertical section 122. In this embodiment, a height H2 of the second vertical section 122 is not larger than a height H1 of the first vertical section 121. That is, the height H2 of the second vertical section 122 is less than or equal to the height H1 of the first vertical section 121.

Additionally in this embodiment, a long concave groove 124 is provided at a junction of the horizontal section 123 and the first vertical section 121 for purposes of draining and ventilating.

The fastening member 2 is fixed on the top portion 11 of the base frame 1. In detail, the fastening member 2 has a main portion 21 put above the top portion 11 of the base frame 1 while the main portion 21 is fixed to the top portion 11 with screws 211. Two wing portions 22 separately extend from both sides of the main portion 21 to be spaced out against the horizontal section 123. An assembling space 5 is formed between the wing portion 22 and the horizontal section 123 for assembling solar panels 6.

The rubber strips 3 are coupled on surfaces of the first vertical sections 121, the horizontal sections 123 and the wing portions 22 facing the assembling space 5. Solar panels 6 abut against the rubber strips 3 firmly to be distant from the base frame 1 and the fastening member 2 when being assembled within the assembling space 5. It can be ensured that the solar panels 6 perform well, or the solar panels 6 shall not be short-circuited by the base frame 1 and the fastening member 2, due to the electricity-insulating character of the rubber strips 3.

Moreover, the rubber strips 3 can also seal gaps to block water from invading into the assembling space 5. Therefore solar panels 6 will not be rusted and the service life can be elongated.

Even though solar panels 6 abut against the first vertical sections 121 and the horizontal sections 123 firmly, air can be ventilated through the groove 124 to lower the temperature, and rainwater can be drained through the groove 124 to avoid puddles damaging the solar panels 6.

What is claimed is:
1. A waterproof and electricity-insulating support structure for solar panels comprising:
   a base frame having a top portion, each of two sides of the top portion connecting with a first vertical section, each of said first vertical section connecting with a horizontal section, each of said horizontal section connecting with a second vertical section, each of said second vertical section connecting with a bottom portion fixed on a steel frame forming a roof, wherein each of said second vertical section is not taller than each of said first vertical section;
   a fastening member fixed to the top portion of the base frame;

two assembling spaces for solar panels respectively formed between the fastening member, the first vertical sections and the horizontal sections; and a plurality of rubber strips capable of for waterproofing and insulating from electricity, the rubber strips being coupled on surfaces facing the assembling spaces of each of the first vertical sections, the horizontal sections and the fastening member to abut against the solar panels.

2. The waterproof and electricity-insulating support structure of claim 1, wherein a groove for draining and ventilating is disposed at each junction of said horizontal section and said first vertical section.

* * * * *